United States Patent [19]
Koike et al.

[11] Patent Number: 5,357,096
[45] Date of Patent: Oct. 18, 1994

[54] LINE TRACING METHOD AND LINE TRACING APPARATUS

[75] Inventors: Yasuo Koike; Tokuji Tanaka, both of Tokyo, Japan

[73] Assignee: Koike Sanso Kogyo Co., Ltd., Tokyo, Japan

[21] Appl. No.: 38,697

[22] Filed: Mar. 29, 1993

[30] Foreign Application Priority Data

Mar. 31, 1992 [JP] Japan .................. 4-103883

[51] Int. Cl.$^5$ .................................................. B23K 7/00
[52] U.S. Cl. ........................................ 250/202; 318/577
[58] Field of Search ............... 250/202; 356/376, 377; 318/577; 364/474.03; 382/60

[56] References Cited

U.S. PATENT DOCUMENTS

| | | | |
|---|---|---|---|
| 3,711,717 | 1/1973 | Rich et al. ................... | 250/202 |
| 4,002,900 | 1/1977 | Sitnichenko et al. ......... | 250/202 |
| 4,207,462 | 6/1980 | Peiffert et al. ............... | 250/202 |
| 4,321,682 | 3/1982 | Koshikawa ................... | 356/376 X |
| 4,371,782 | 2/1983 | Brouwer ........................ | 250/202 |
| 4,453,084 | 6/1984 | Brouwer ........................ | 250/202 |
| 4,486,654 | 12/1984 | Brouwer ........................ | 250/202 |
| 4,493,968 | 1/1985 | Brown ........................... | 318/577 X |
| 4,578,574 | 3/1986 | Grant et al. ................... | 250/202 |
| 4,590,356 | 5/1986 | Povlick et al. ................ | 318/577 X |
| 4,613,749 | 9/1986 | Vali ............................... | 250/202 |
| 4,672,190 | 6/1987 | Rostkowski et al. .......... | 250/202 |
| 4,764,669 | 8/1988 | Decker et al. ................. | 250/202 |
| 4,872,105 | 10/1989 | Mozayeny ...................... | 250/202 X |

*Primary Examiner*—David C. Nelms
*Assistant Examiner*—John R. Lee
*Attorney, Agent, or Firm*—Townsend & Banta

[57] ABSTRACT

A FIG. 1 is taken by a camera having optical/electrical elements arrayed in matrix, signals of pixels of the picture taken by the camera 2 are converted into binary data in a binary circuit 11, and the binary data is temporarily stored in a binary data storage device 12. The reference point 0 is determined on the edge of the figure, and plural coaxial circle scanning lines A, B about the reference point 0 which differs from each other in radius are set. In arithmetic circuit 15, coordinate data of pixels on the circle scanning lines A, B is operated. In the detector 16, binary data of the pixels on the circle scanning lines A, B is detected. In the decision circuit 17, the vectors from the reference point 0 to the detected pixels on the circle scanning lines A, N, and the vector angle between the obtained vectors is operated. A speed signal according to the vector angle is generated for driving the first and second drive 7, 8.

3 Claims, 6 Drawing Sheets

LINE TRACING METHOD AND LINE TRACING APPARATUS

FIELD OF THE INVENTION

The present invention relates to a method for tracing a figure drawn on drawing paper and a tracer therefor and particularly to an improved method for tracing a figure with high tracing accuracy and an improved tracer therefor.

BACKGROUND OF THE INVENTION

Parts with contours having curves and bends are cut out from material, for example, steel plate, stainless steel plate, or nonferrous metal plate such as aluminum plate, plastic plate such as acrylic resin plate, or plywood, by using a torch such as a gas cutting torch, plasma cutting torch or laser cutting torch.

The following are methods for continuously controlling the movements of a torch: (i) a numerical controlling method in which the position of the torch is designated on an orthogonal coordinate system and the path of the torch directed from the present point to the second point is given by a straight line or arc on a orthogonal coordinate system; (ii) all optical tracing method ill which the reference point corresponding to the torch is set on a given portion of a figure, the direction from the reference point to a portion of line or edge of the figure positioned at a distance from the reference point is detected, and the torch is moved in the detected direction. The latter method is low-cost, and handy. Further in the latter method, a torch can be controlled at a relatively high speed. Therefore, the optical tracing method is widespread.

A typical tracer is disclosed in Japanese patent publication of application No. 16916 of 1974. This tracer, as shown in FIG. 6, comprises a lens 52 rigidly fixed on a housing 51, a photocell 53 mounted on the surface of the lens 52 coaxially with the center of the lens 512, a shaft 55 rotated by a motor 54 mounted on the axis of the lens 52, a generator 56 which has two rotors 56a, 56b rigidly fixed on the shaft 55 at a right angle to each other, and a mirror 58 disposed eccentrically to the axis of the motor 54, and on which an image of a portion of a FIG. 57 on a drawing paper is formed.

The lens 52 is disposed above the FIG. 57, and the motor 54 is driven to rotate the shaft 55, while the mirror 58 scans a point 0 at a distance from the projective point 0 of the axis of the lens 52, which position depends on an interval between the mirror 58 and the axis of the lens 52 and the tilting angle of the mirror 58. While the mirror 58 scans the edge of the FIG. 57, output of the photocell 53 changes. Outputs in two orthogonal directions from the generator 56 are detected simultaneously with a change in the output of the photocell 53. The housing 51 is moved according to the detected output from the generator 56 by which the edge of the FIG. 57 can be traced. Accordingly, the edge of the FIG. 57 can be traced by moving the means for moving the housing 51 together with the means for holding a torch or by moving the means for holding a torch according to the output of the generator 56 so that parts with the same contour as that of the FIG. 57 can be cut out from material.

In the above-mentioned tracer, the figure is pre-read, then the edge of the figure is traced. Therefore, in case the figure has a corner with a relatively small radius of curvature, a portion of the contour of parts corresponding to the corner in the figure is formed into a curve with a big radius of curvature.

Figure 6:
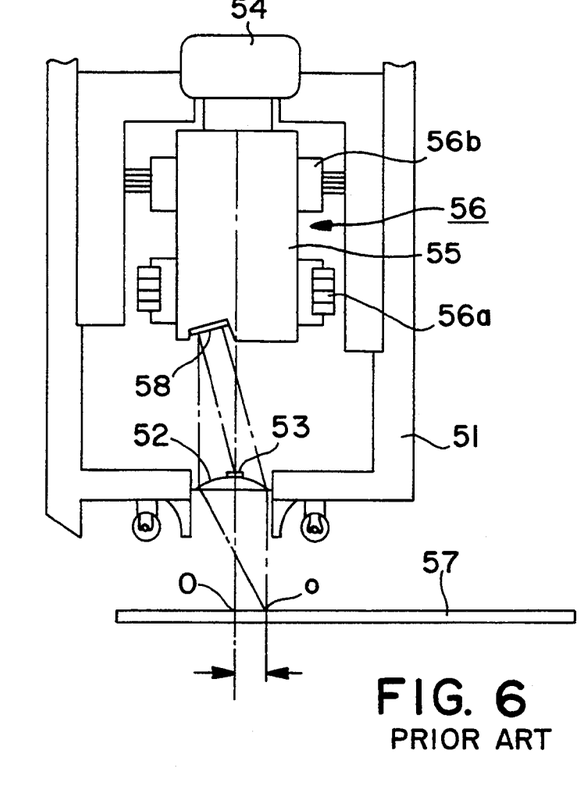
FIG. 6 is a cross-sectional view of a conventional tracer.
Figure 7:
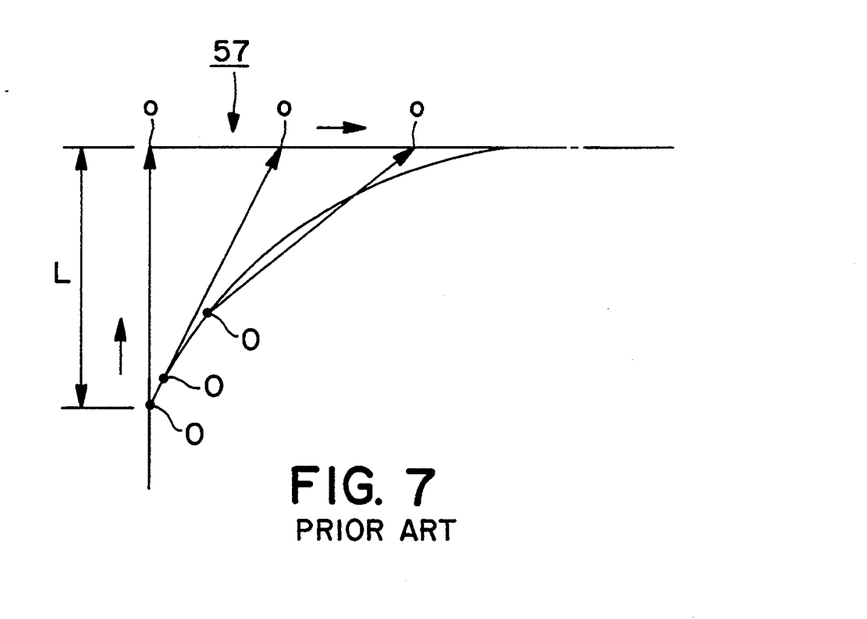
FIG. 7 is a view showing the problem of the conventional tracer.

That is, as shown in FIGS. 6 and 7 when the lens 52 is disposed at a distance from the FIG. 57, the distance between the projective point 0 of the axis of the lens on the figure and the scanning point 0 of the mirror which is set according to the preset tilting angle of the mirror 58 and the distance between the mirror and the axis of the lens 52 is set as prereading amount L. Then, when the scanning point 0 is moved along the edge of the FIG. 57 having the corner with a relatively small radius of curvature, outputs of two orthogonal components from the generator 56 according to the direction from the projective point 0 to the scanning point 0 are sent to the means for moving a torch so that the torch is moved passing the projective points 0 without passing the corner in the figure with the result that the torch moves in a curved path with a big radius of curvature.

In order to improve the tracing accuracy, it has been tried to mount plural mirrors having tilting angles different from each other on the shaft so that plural points can be scanned. However, as the tracer is precision equipment, there is a limit in improving the tracing accuracy by optically processing the figure. Therefore, the above-mentioned trial has not been achieved.

BRIEF SUMMARY OF INVENTION

It is an object of the present invention to provide a tracing method in which the tracing accuracy is improved.

Another object of the present invention is to provide a tracer by which figure can be traced with the improved tracing accuracy.

The first object of the present invention is achieved by a method tracing a figure while taking a picture of the figure to be traced with a movable camera having plural optical/electrical elements arrayed in matrix, the method comprising the steps of: setting the reference point at a given point oil the picture and setting plural coaxial circle scanning lines about the reference point 0 which differs from each other in radii; converting the picture information taken by the camera into binary signals; scanning pixels of the picture information converted into binary signals in a given direction along the plural coaxial circle scanning line and detecting pixels on which a change in binary signals is found; determining coordinates of the detected pixels and deciding each vector of the reference point to each pixel on each circle scanning line from the coordinates of the detected pixels; operating a vector angle between the vectors, and determining the moving speed of the camera according to the vector angle.

The second object of the present invention is achieved by a tracer comprising: a camera having plural optical/electrical elements arrayed in matrix; a moving means for moving the camera; a conversion means for converting the picture information taken by the camera into binary signals; a storage means for temporarily storing the binary signals generated in the conversion means; an input means for inputting the numeric value of radii of circle scanning lines; a detection means in which data on the binary signals in the storage means are read out from the storage means and the binary signals of several pixels and a change in the binary signals are detected by scanning the data along coaxial circle scanning lines about the preset reference point with given radii; a decision means for deciding vectors directed from the reference point to each of the pixels on each circle scanning line on which a change in binary signals is found by the detection means, operating a vector angle between the vectors, generating the speed signal of the camera according to the vector angle; and a driving means for sending driving signals according to the speed signal to the moving means when the speed signal is sent from the decision means.

According to the tracing method of the present invention, even in case of the figure having portions of edge of big radius of curvature such as curves, bends, and corners, the figure can be traced with accuracy by moving the camera at the speed of the camera (tracing speed) determined by prereading the existence of a corner.

That is, the edge of a figure to be traced can be detected by taking a picture of the figure by a movable camera having plural optical/electrical elements arrayed in matrix, converting the picture into binary signals, setting the reference point at a given point on the picture and coaxial circle scanning lines about the reference point which differs from each other in radius, and detecting a change in the binary signals while scanning several pixels positioned on the coaxial circle scanning lines. Then, the condition of a portion of the edge of the figure positioned in the annular zone between coaxial circle scanning lines (whether the portion of the edge of the figure is formed of a straight line or not) can be determined, and the radius of the curvature in the portion of the edge of the figure can be estimated by detecting vectors from the reference point to the pixels on which a change in binary signals is found, and operating a vector angle between the vectors.

Further, data on tracing speed which makes it possible to trace a curved edge and a corner of the figure with high accuracy is known empirically, and data on tracing speed of the curved edge portion of the figure according to the radius of curvature thereof is known. Accordingly, the recognition of the shape of the edge portion of the figure positioned in the annular zone between coaxial circle scanning lines from the vector angle makes it possible to determine the appropriate tracing speed according to the vector angle.

It is not necessary to make the exact estimation the shape of the edge portion of the figure positioned in the annular zone between the coaxial circle scanning zone. The determination of the tracing speed according to the vector angle makes it possible to improve the tracing accuracy. As the radius of curvature of the edge portion of the figure positioned in the annular zone between coaxial circle scanning zone becomes larger, the vector angle is increased. Accordingly, the exact tracing of the corner of the figure is possible by the determination of tracing speed based on the radius of the curvature of the edge portion of the figure positioned in the annular zone between coaxial circle scanning lines, which is estimated from the vector angle, thereby, the tracing accuracy can be increased.

Further, according to the above-mentioned tracer, numerical values of coaxial circle scanning lines about the reference point, which differs from each other in radius can be previously inputted through an input unit. The figure to be traced can be taken by a camera having plural optical/electrical elements arrayed in matrix. The picture information taken by the camera can be converted into binary signals by the converting means, and the binary signals can be stored in the storage means. Then the stored binary signals can be read, the read binary signals are scanned according to the information on the reference point and coaxial circle scanning lines, while a change in the read binary signals on several pixels on several coaxial circle scanning lines are detected in the detection means, and a vector directed from the reference point to the pixels on which a change in binary signal is found call be determined. The speed signal can be generated according to the vector.

DETAILED DESCRIPTION OF THE INVENTION

One embodiment of the tracer according to the present invention and the tracing method according to the present invention are hereinafter explained.

Figure 1:
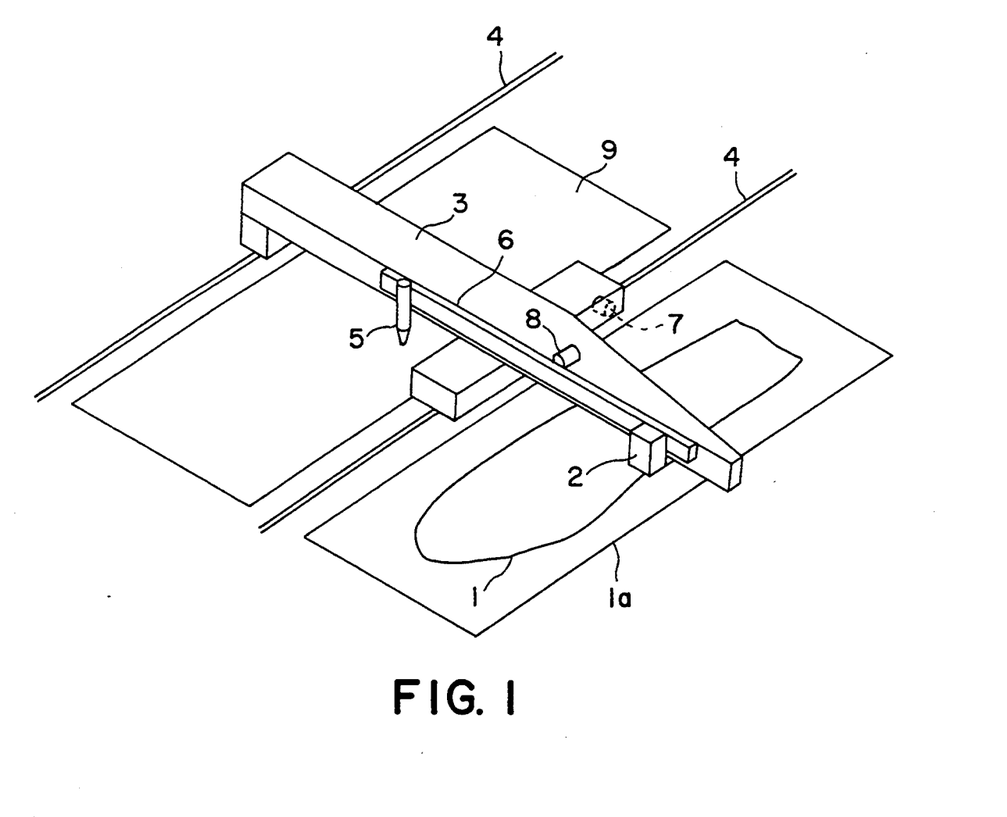
FIG. 1 is a perspective view of a cutting device for cutting material with tracing a figure drawn on a drawing paper, in which the relation between the figure to be traced and a camera is shown.

The tracer according to the present invention is connected to a cutter shown in FIG. 1, wherein a FIG. 1 shown in a drawing paper 1a is copied by taking a picture of the FIG. 1 drawn on the drawing paper 1a by a camera 2.

First, the cutter is explained referring to FIG. 1. The cutter comprises a portal frame 3. The frame 3 is movably mounted on a pair of rails laid in the X direction. A saddle 6 by which the camera 2 and a torch 5 is held together as a unit is mounted on the frame 3 in the Y direction perpendicularly intersecting with the rails 4. A first drive 7, including a servomotor for moving the frame 3 on the rail 4 in the X direction, and a second drive 8, including a servomotor for moving the saddle 5 on the frame 3 in the Y direction are mounted on the frame 3.

Cuts are made with the above-mentioned cutter as follows: first a picture of a portion of the FIG. 1 is taken; then the picture is processed as mentioned later, by which vector data on the edge of the figure 1 is taken from the picture information in a control unit; binary signals in the directions at right angles are outputted according to the vector data from the control unit to the first drive 7 and the second drive 8; and the first drive 7 and the second drive 8 are driven according to the signals by which the frame 3 is moved on the rail 4 in the X direction by a distance which corresponds to the binary signals and the saddle 5 is moved on the frame 3 in the Y direction by a distance which corresponds to the binary signals so that a part with the same shape as the FIG. 1 can be cutting out of cut material by the torch 5. It is possible to adjust the driving of the drives 7, 8 so as to decrease the tracing speed at the corner of the figure to be traced.

FIG. 1 is drawn in pencil or ink on the drawing paper 1a in such a manner that the FIG. 1 can be copied by a conventional optical tracer.

Figure 2:
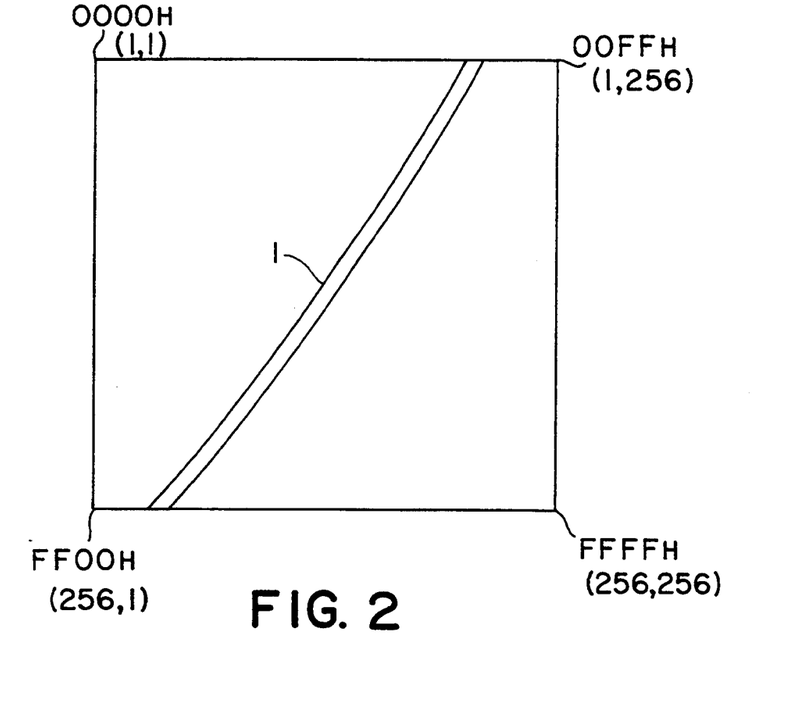
FIG. 2 is a view showing the picture taken by the camera.

The camera 2 has plural optical/electrical converting elements arrayed in matrix (not shown). A camera on the market can be also applied to the camera 2. In the present embodiment, the camera 2 has 256 pieces of optical/electrical converting elements (pixels) arrayed in matrix, wherein one pixel corresponds to 0.1 mm so that a picture of a line drawn on the drawing paper can be taken and analyzed. Accordingly, the camera 2 has a picture area of 25.6 mm×25.6 mm. When a picture of a portion of the FIG. 1 is taken by the camera 2, the picture area is limited within 25.6 mm×25.6 mm as shown in FIG. 2.

Figure 5:
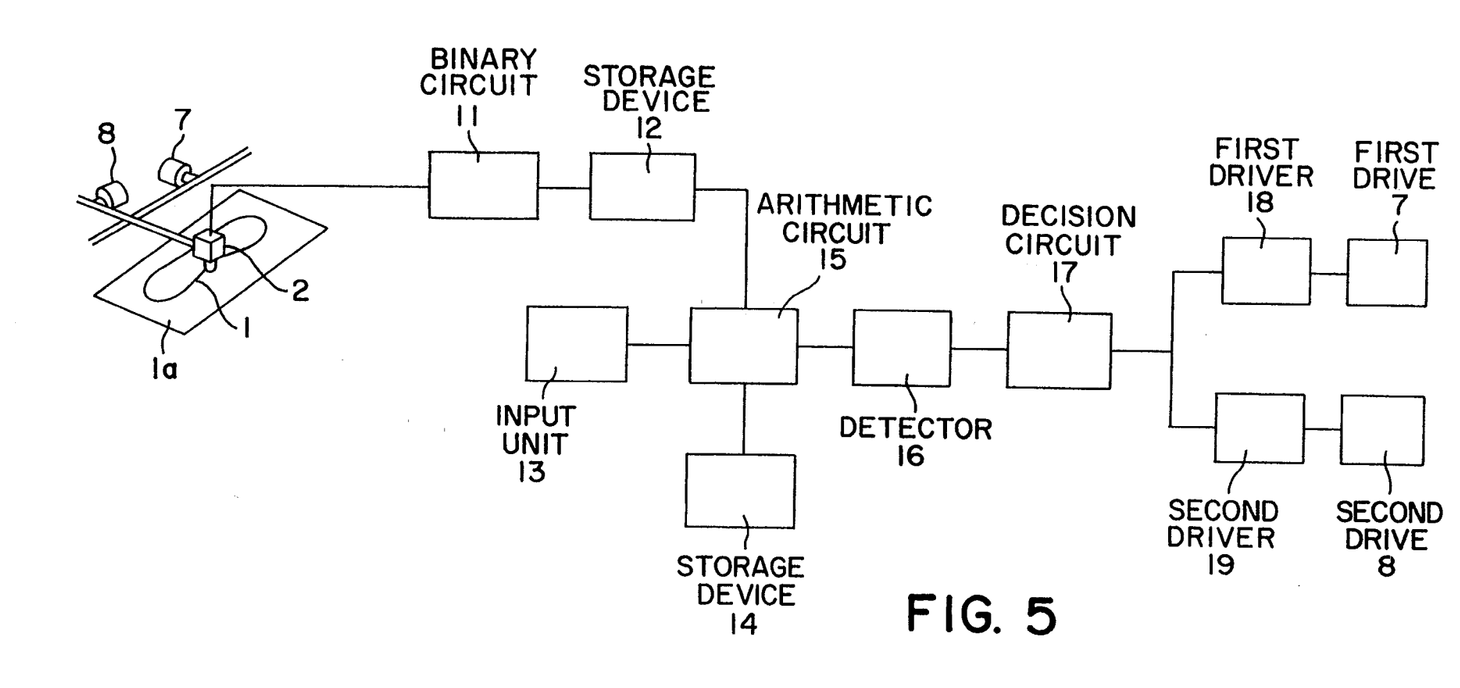
FIG. 5 is a block diagram of the tracing equipment.

Next the control unit is explained referring to FIG. 5. The control unit comprises a binary circuit 11 connected to the camera 2, a binary data storage device 12 connected to the binary circuit 11, an input unit 13, an arithmetic circuit 15 connected to the binary data storage device 12 and the input unit 13, a storage device 14 connected to the arithmetic circuit 15, a detector 16 connected to the arithmetic circuit 15, a decision circuit 17 connected to the detector 16, first driver 18 connected to the first drive 7, and second driver 19 connected to the second drive 8. Signals of several pixels taken by the camera 2 are converted into binary data of "1" and "0" depending on the amount of light which are inputted to several pixels in the binary circuit 1. In this binary circuit 11, a signal "1" is generated for a pixel corresponding to a part of a line of the FIG. 1 shown in FIG. 1, while a signal "0" is generated for a pixel corresponding to a white ground of the drawing paper. Binary data of several pixels are sent in the order of arrangement of several pixels in the picture area.

Binary data of several pixels generated in the binary circuit 11 are temporarily stored in the order of arrangement of several pixels in the picture area in the binary data storage device 12. When first binary data on pixels corresponding to one portion of the FIG. 1 are stored in the binary data storage device 12 and thereafter second binary data on pixels corresponding to another portion of the FIG. 1 are sent from the binary circuit 11, first, the first binary data are erased, and then the second binary data are stored in the binary data storage device 12.

The input unit 13 includes the feature which operates for inputting radii of coaxial circle scanning lines through the input unit 13 to the arithmetic circuit 15. As the input unit 13, either input equipment in which digital value can be inputted, such as a keyboard, or input equipment in which analog value can be inputted, such as a variable resistor, can be used. Further, the control unit can be formed in such a manner that the radius of the coaxial circle scanning lines can be preset in the hereinafter-mentioned storage device 14 so that radii of coaxial circle scanning lines stored in the storage device 14 can be designated.

The cutter further includes a setting means ( not drawn ) for setting the cutting speed, wherein the speed inputted through the setting means is the basic moving speed of the camera 2; that is, the tracing speed in the X-Y direction.

Figure 4:
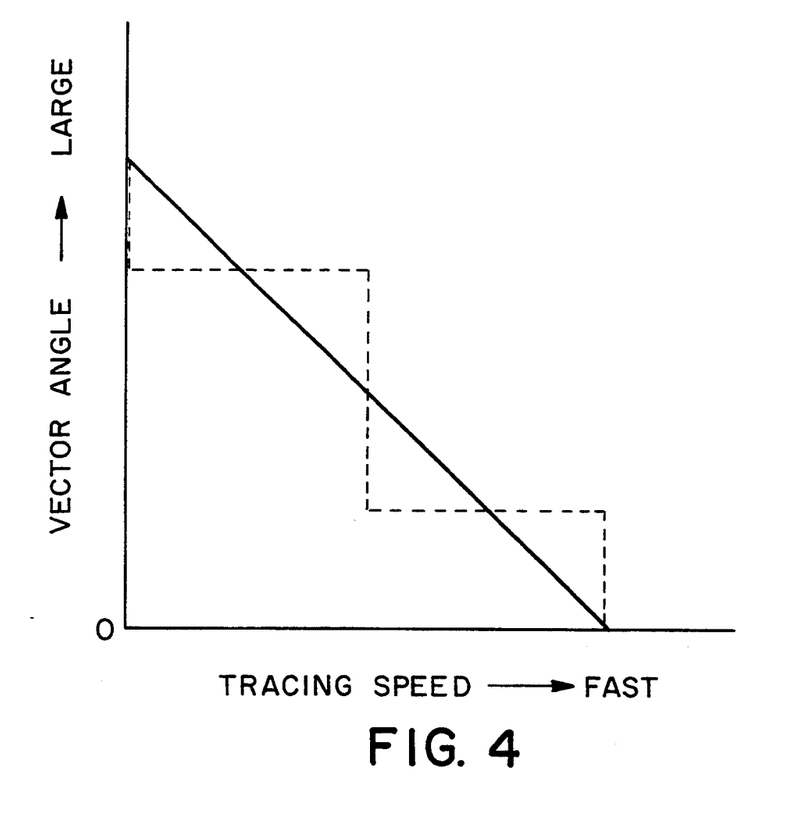
FIG. 4 is a graphical representation showing the relation between the vector angle and the tracing speed.

The preset position data of the reference point, the arithmetic expression for operating and specifying coordinate data of pixels to be scanned according to numeric value of radii of coaxial circle scanning lines inputted from the input unit 13 and position of the reference point, and the data on the tracing speed corresponding to the vector angle $\theta$ shown in FIG. 4 are stored in the storage device 14.

When the numeric value of radii of coaxial circle scanning lines is inputted from the input unit 13 to the arithmetic circuit 15, the arithmetic circuit 15 reads out the arithmetic expression stored in the storage device 14 from the storage device 14, operates and specify coordinate data of pixels to be scanned with the arithmetic expression, and the specified coordinate data is stored in the storage device 14 or other storage device.

The detector 16 reads out binary data corresponding to the coordinate data of coaxial circle scanning lines, which has been evaluated and specified in the arithmetic circuit 15 from the binary data storage device 12 so that the edge of the FIG. 1 are detected by deciding pixels of binary data of "1". In the detector 16, plural pixels are detected corresponding to several circle scanning lines.

After the edge of the FIG. 1 is detected in the detector 16, the vector of from the reference point 0 to the pixels of binary data of "1" corresponding to several coaxial circle scanning lines is decided from coordinate data of the pixels, and the vector angle between the vectors are operated. Further, comparing the obtained vector angle with the speed data stored in the storage device 14, the speed signal according to the vector angle is estimated. Driving signals corresponding to the X direction and Y direction are outputted to the first and second drives 7 and 8, respectively, so that the first and second drives can be driven according to the driving signals corresponding to the X direction and the Y direction.

Figure 3A:
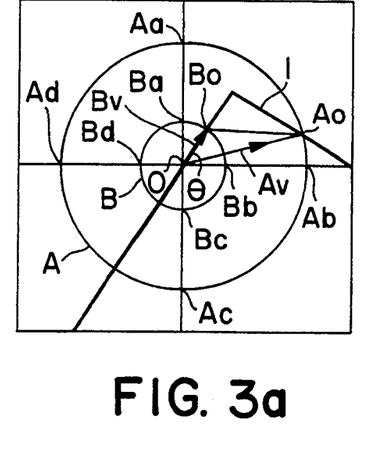
FIG. 3(a), 3(b) and 3(c) are views showing a portion of the figure with pixels for explaining the tracing method.
Figure 3B:
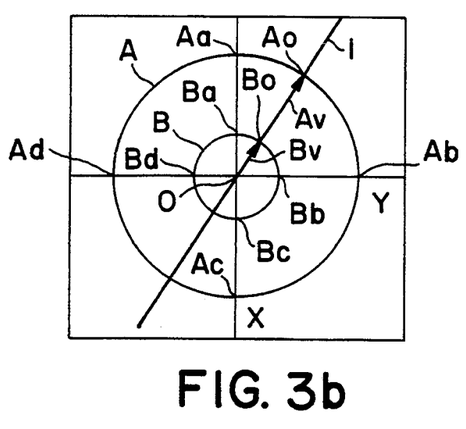
Figure 3C:
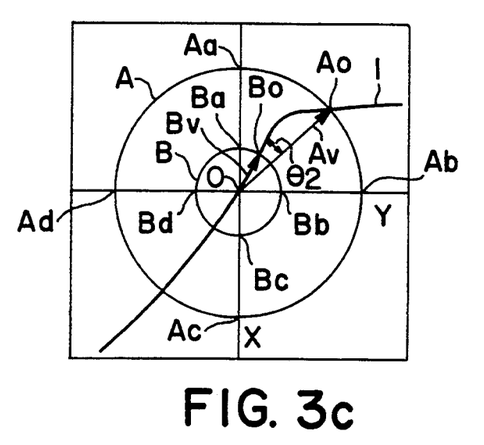

Next, a method for tracing the FIG. 1 with the picture shown in FIG. 2 is explained. FIGS. 3(a), 3(b), 3(c) show binary pictures in which the preset reference point 0 and coaxial circle scanning lines A, B, which differs from each other in radius inputted through the input unit 13, and in which the reference point 0 is located coinciding with the center of the torch 5. The pixel on both the 128 in the longitudinal direction and the 128 in the transverse direction among 256 pieces located longitudinally and transversely is set as the reference point 0. Position of the reference point set to be (80, 80)$_H$ A X-Y rectangular coordinate system which has a center of the reference point 0 can be set by setting a position of the reference point 0.

Numeric value of radii of coaxial circle scanning lines A, B are inputted from the input unit 13, and the pixels to be scanned are specified. There are various ways for specifying pixels to be scanned. In the present invention, the expression: $L=(X^2+Y^2)^{\frac{1}{2}}$ is stored ill the storage device 14, and points Aa to Ad, Ba to Bd corresponding to several circle scanning lines are set on each coordinate axis, and scanning is made from the points, Aa, Ba toward the points Ab, Bb.

For example, when the radius of the circle scanning line A is set to 10 mm, and the radius of the circle scanning line B is set to 4 mm, since one pixel corresponds to 0.1 mm, if the reference point 0 is the origin, the position of A point is expressed in the decimal coordinates: (100, 0). In the circle scanning line A, when L is equal to 100, X value corresponding to Y value is operated by the above-mentioned expression by changing Y from 0 to 100. In the circle scanning line B, when L is equal to 40, X value corresponding to Y value is operated by the above-mentioned expression by changing Y from 0 to 100. The obtained coordinates (X, Y) corresponding to the circle scanning lines A, B are those of the specified pixels which corresponds to the set circle scanning lines A, B.

Therefore, the numerical value of radii of the circle scanning lines A, B is inputted through the input unit 13, the arithmetic circuit 15 reads out the above-mentioned expression from the storage device 14, and coordinates of pixels on the set circle scanning lines A, B are operated in the arithmetic circuit, coordinate data of these pixels are stored in the storage device 14. That is pixels composing the circle scanning line 21 shown in FIGS. 3(a) and 3(b) are specified.

Several pixels of the picture taken by the camera 2 are converted into binary signals in the binary circuit 12, and binary data of several pixels are sent in the order of arrangement of pixels to the binary data storage device 12 in which binary data of all pixels are temporarily stored in the order of arrangement of pixels.

The detector 16 reads out coordinate data of pixels composing the circle scanning lines A. B which has been stored in the storage device 14 from the storage device 14, and reads out binary data of pixels corresponding to the read out coordinate data from the binary data storage device 12. The binary data are scanned in order in the direction of from points Aa. Ba toward points Ab. Bb, while binary data of "1" of pixels and binary data of "0" of pixels are identified. The detection of the edge of the FIG. 1 corresponding to the circle scanning lines A, B is made by finding pixels having data "1" by this scanning.

Further, in the decision circuit 17, coordinate data of the pixels Ao, Bo having data "1" for the circle scanning lines A, B are verified, and coordinates of the pixels Ao, Bo, on the coordinate system which has the origin at the reference point 0. That is, vectors from the reference point 0 to the pixels Ao, Bo are decided. The vector for the circle scanning line B is divided into the X component and the Y component. The amounts corresponding to the X component and the Y component is outputted to the first and second drivers 18 and 19, respectively. Further, in the decision circuit 17, the vector angle $\theta$ between vector Av for the circle scanning line A and vector Bv for the circle scanning line B is operated, and the obtained vector angle is sent as the speed signal according to the vector angle $\theta$ to the drive 18, 19.

As shown in FIG. 3(b), in case the FIG. 1 to be traced includes a straight line or an extremely large radius of curvature is traced, the vector angle $\theta$ is 0°. That is, when the vector angle is 0°, the figure to be traced is a straight line. In this case, the tracing is made continuously at the preset tracing speed.

As shown in FIGS. 3(a), 3(c), in case the figure to be traced includes the corner with the extremely small radius of curvature, the vector angle $\theta 2$ between the vector Av for the circle scanning line A and the vector Bv for the circle scanning line B is found. Thus, when the vector angle is not 0°, it can be estimated that the figure to be traced is formed of a curved line or that the figure to be traced has a bend portion between the annular zone between the circle scanning line A and the cycle scanning line B. Further, when the vector angle is not 0°, it should be decided whether the tracing speed needs to be decreased or not) from the operation of the vector angle $\theta$.

A method for deciding the tracing speed is explained hereinafter. Since the radius of the circle scanning line A and the radius of the circle scanning line B are preset to 10 mm and 4 mm, respectively, the radius of curvature of the edge portion of the FIG. 1 existing between the circle scanning line A and the circle scanning line B can be estimated by finding the shape of a triangle Δ 0-Ao-Bo from the radii of the circle scanning lines A, B and the vector angle $\theta$. Further, as above-mentioned, the appropriate tracing speed at which corner and a partial curve of the figure can be traced can be determined from experience. The larger the radius of curvature in the figure to be traced becomes, the lower the tracing speed becomes. Accordingly, the tracing speed for the radius of curvature in the FIG. 1 existing between the circle scanning line A and the circle scanning line B can be appropriately determined from the vector angle $\theta$.

Accordingly, the speed signal can be obtained by appropriately tracing a portion of the figure between the cycle scanning line A and the circle scanning line B, by storing the speed data for the vector angle $\theta$ shown in FIG. 4 with a solid line in the storage device 14, and comparing the preset speed data with the obtained vector angle $\theta$.

Further, when the vector angle $\theta$ changes, it is not necessary to immediately change the tracing speed according to the change in the vector $\theta$, but when a change in the vector angle $\theta$ reaches to an extent, the tracing speed can be adjusted in steps. The speed signal can be also obtained by appropriately the cycle scanning lies A, B by storing the speed data for the vector angle shown in FIG. 4 with dotted line at the storage device 14, and comparing the preset speed data with the obtained vector angle $\theta$ in the decision circuit 17. The speed data shown in FIG. 4 is determined empirically.

What is claimed is:

1. A line tracing method for moving a camera having plural optical/electrical elements arrayed in matrix, comprising the steps of:
    setting a reference point 0 at a given point on the picture and setting plural coaxial circle scanning lines about the reference point 0, said coaxial circles having different radii from each other;
    converting picture information taken by the camera into binary signals;
    scanning pixels of the converted picture information and detecting locations of pixels on intersections of a traced line and each coaxial scanning line;
    deciding vectors from the reference point 0 to each detected pixel on the intersections;
    calculating a vector angle between the vectors; and
    determining a moving speed of the camera according to the vector angle.

2. A line tracing method according to claim 1, wherein the pixels on the intersection of the traced line and plural coaxial circle scanning lines are detected by scanning pixels of picture information along the plural coaxial circle scanning lines in a given direction.

3. Line tracing apparatus comprising:
    a camera having plural optical/electrical elements arrayed in matrix;
    a moving means for moving the camera;
    a conversion means for converting picture information taken by the camera into binary signals;
    a memory for temporarily storing the binary signals generated in the conversion means;
    a scanning means for scanning a traced line along plural coaxial circle scanning lines about a reference point 0 by using the binary signals in the memory and for detecting locations of pixels on intersections of the traced line and each coaxial scanning line; and
    controlling means for changing the moving speed of the camera according to a vector angle formed by each vector from the reference point 0 to the detected pixels on the intersections.

* * * * *